US012654454B2

(12) United States Patent
Kubozono et al.

(10) Patent No.: US 12,654,454 B2
(45) Date of Patent: Jun. 16, 2026

(54) PRINTING APPARATUS, CONTROL METHOD THEREOF, AND STORAGE MEDIUM

(71) Applicant: CANON KABUSHIKI KAISHA, Tokyo (JP)

(72) Inventors: Kenji Kubozono, Tokyo (JP); Akira Kuronuma, Tokyo (JP); Hideya Tabeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 18/545,865

(22) Filed: Dec. 19, 2023

(65) Prior Publication Data

US 2024/0208232 A1 Jun. 27, 2024

(30) Foreign Application Priority Data

Dec. 23, 2022 (JP) ................................. 2022-207245

(51) Int. Cl.
*B41J 2/175* (2006.01)
*G06F 3/12* (2006.01)

(52) U.S. Cl.
CPC ......... *B41J 2/17509* (2013.01); *B41J 2/1753* (2013.01); *B41J 2/17546* (2013.01); *G06F 3/121* (2013.01); *G06F 3/1229* (2013.01); *B41J 2002/17579* (2013.01)

(58) Field of Classification Search
CPC .. B41J 2/17509; B41J 2/1753; B41J 2/17546; B41J 2002/17579; B41J 2/175; B41J 2/17513; B41J 2/17566; B41J 29/13; B41J 29/38; B41J 2/01; G06F 3/121; G06F 3/1229
USPC .......................................................... 347/85
See application file for complete search history.

(56) References Cited

U.S. PATENT DOCUMENTS

2003/0140694 A1* 7/2003 Usui .................... B41J 2/17566
73/290 V
2020/0247135 A1* 8/2020 Higuchi ............... B41J 2/17509

FOREIGN PATENT DOCUMENTS

JP 2017001249 A 1/2017

* cited by examiner

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

A printing apparatus includes a liquid storage unit that stores liquid to be supplied to a printhead, which performs printing by discharging the liquid, a liquid amount detection unit that detects an amount of the liquid stored in the liquid storage unit, and a control unit that performs control to, in response to a start of liquid filling into the liquid storage unit, provide notification of the amount of the liquid detected by the liquid amount detection unit.

19 Claims, 21 Drawing Sheets

F I G. 1
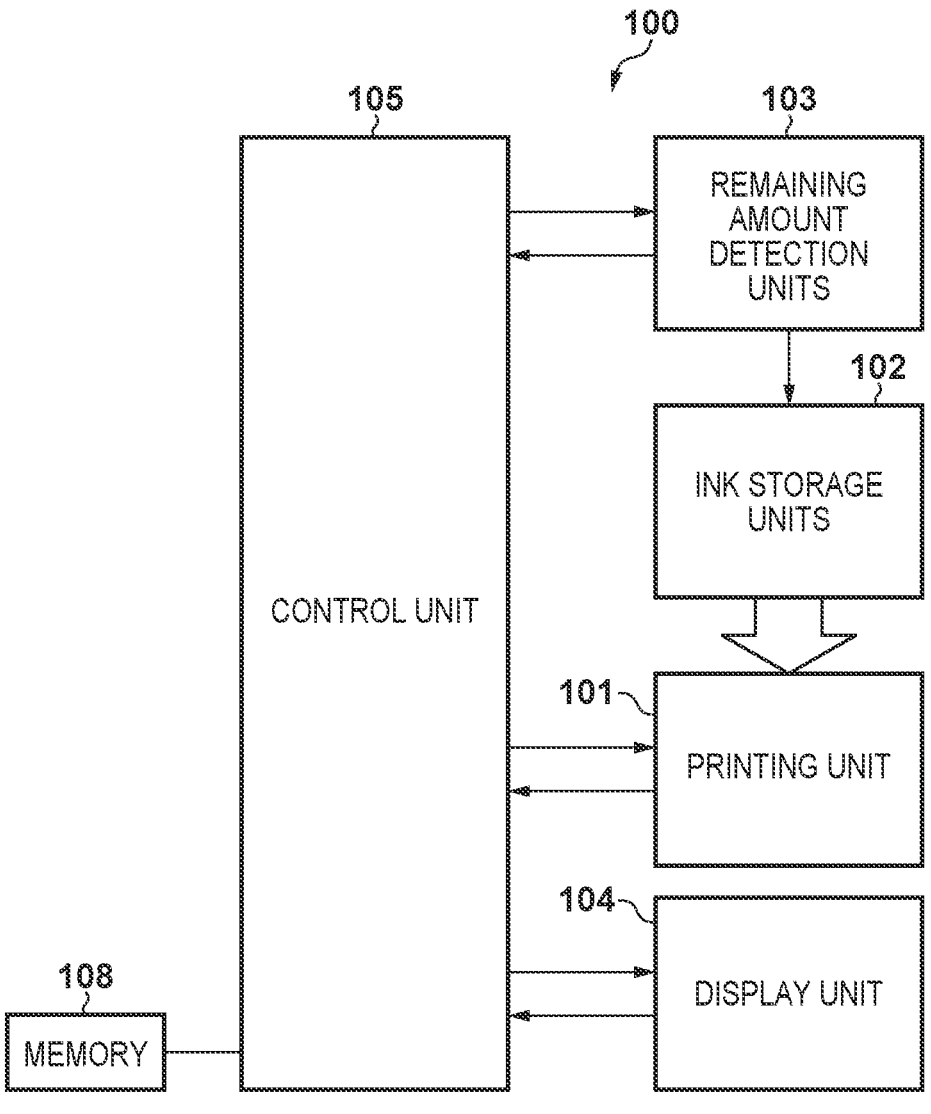

F I G. 2
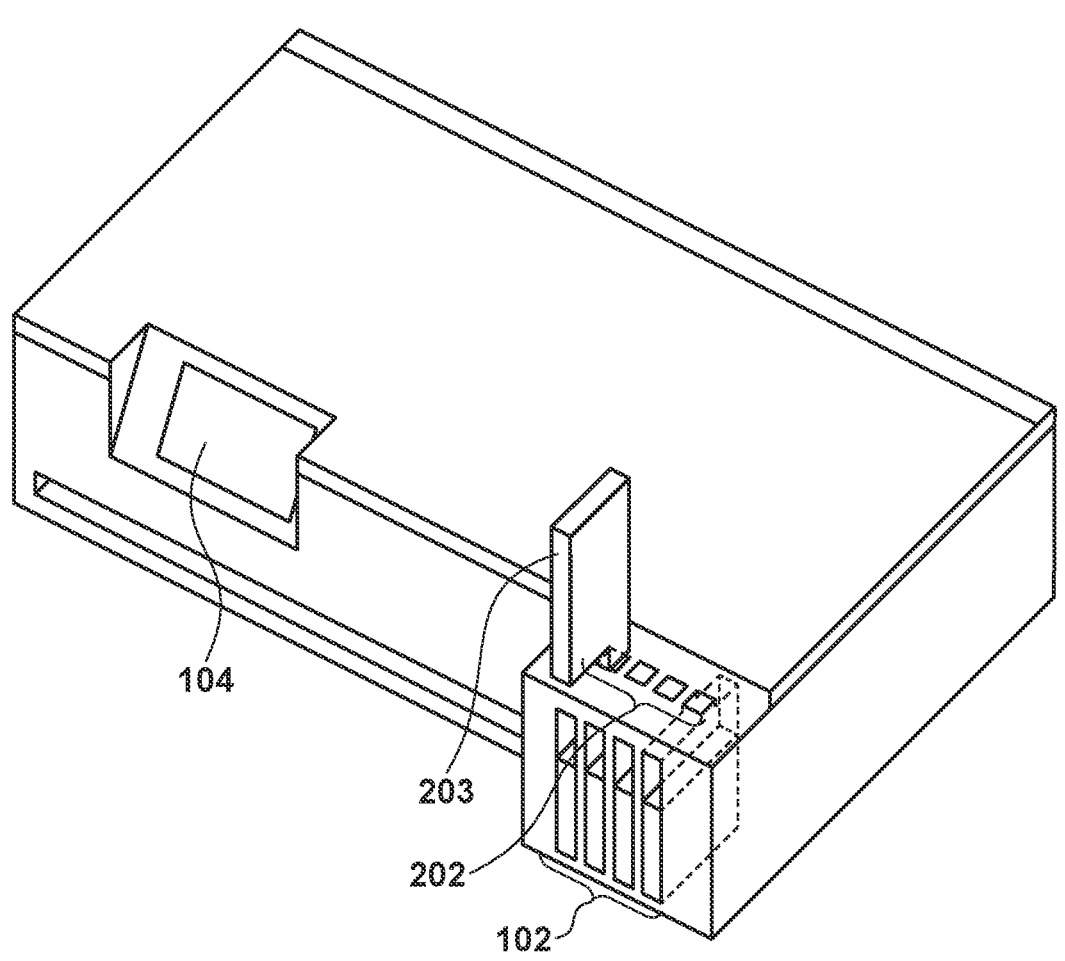

F I G. 4
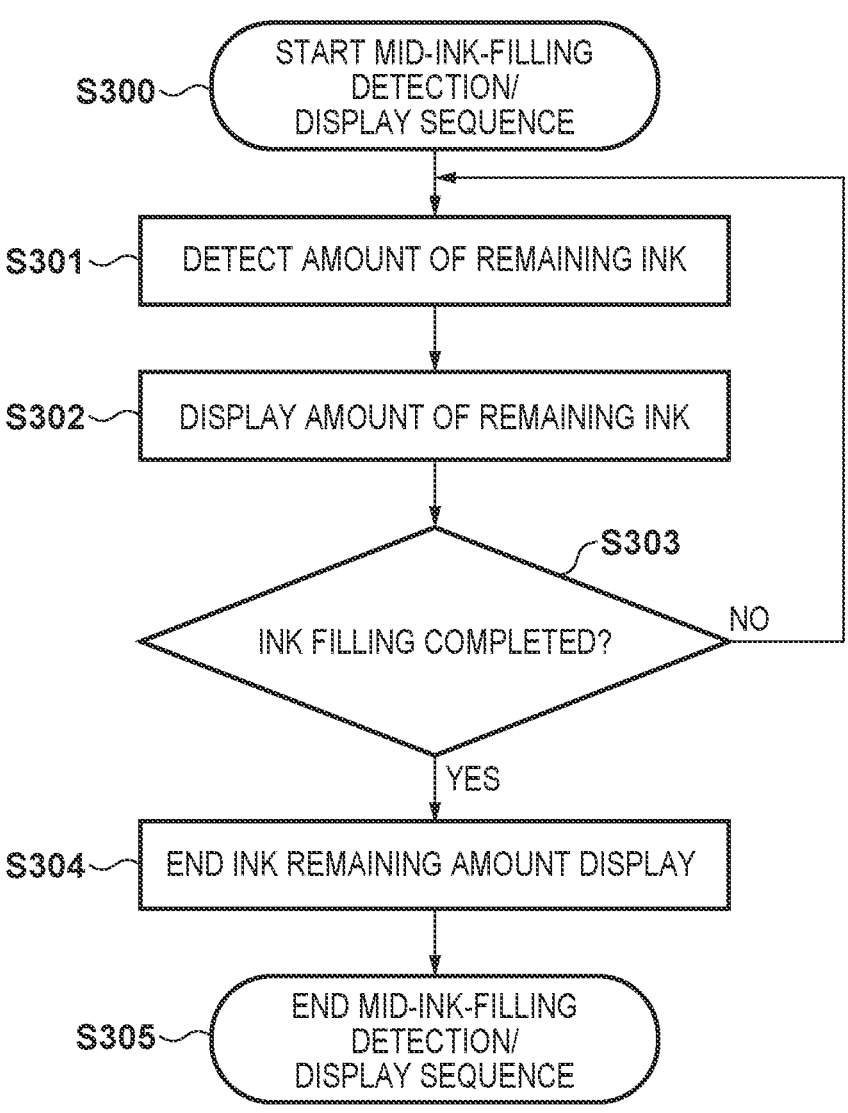

F I G. 6
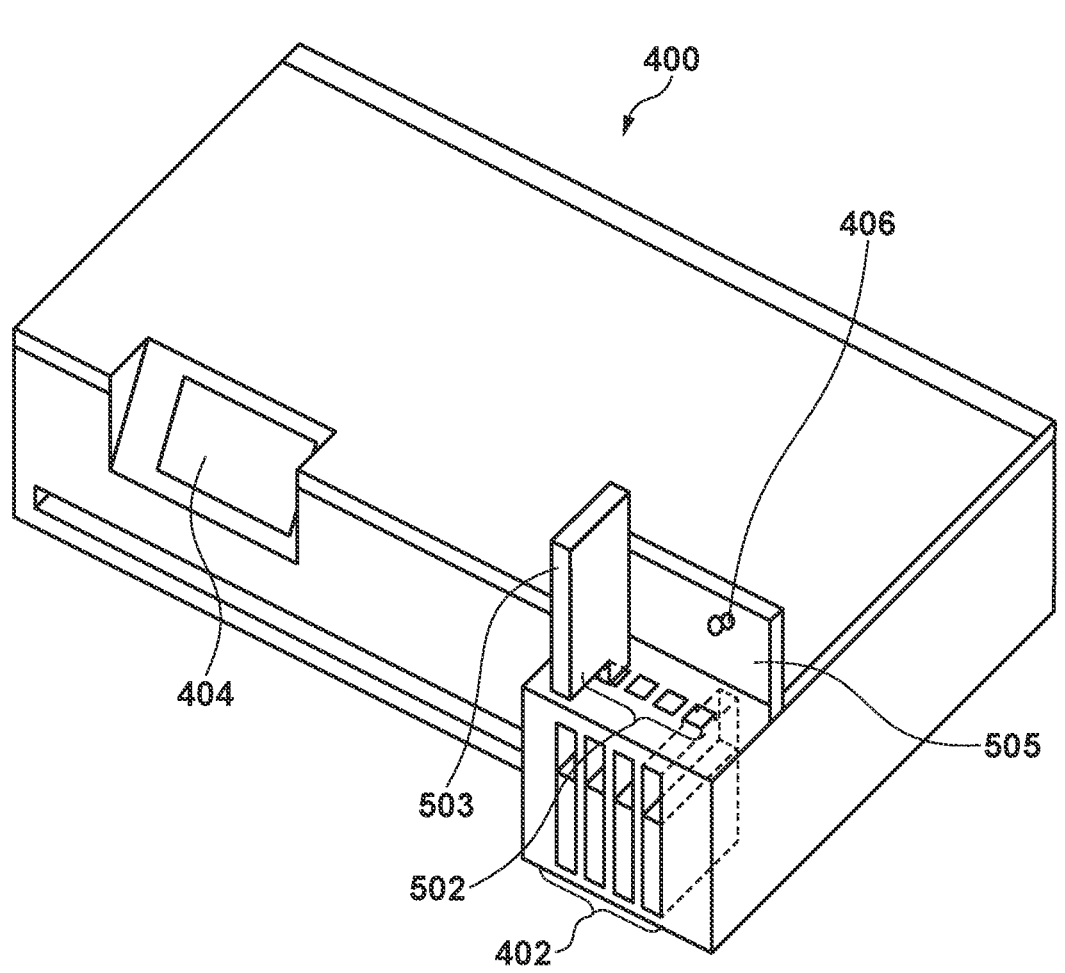

F I G. 7
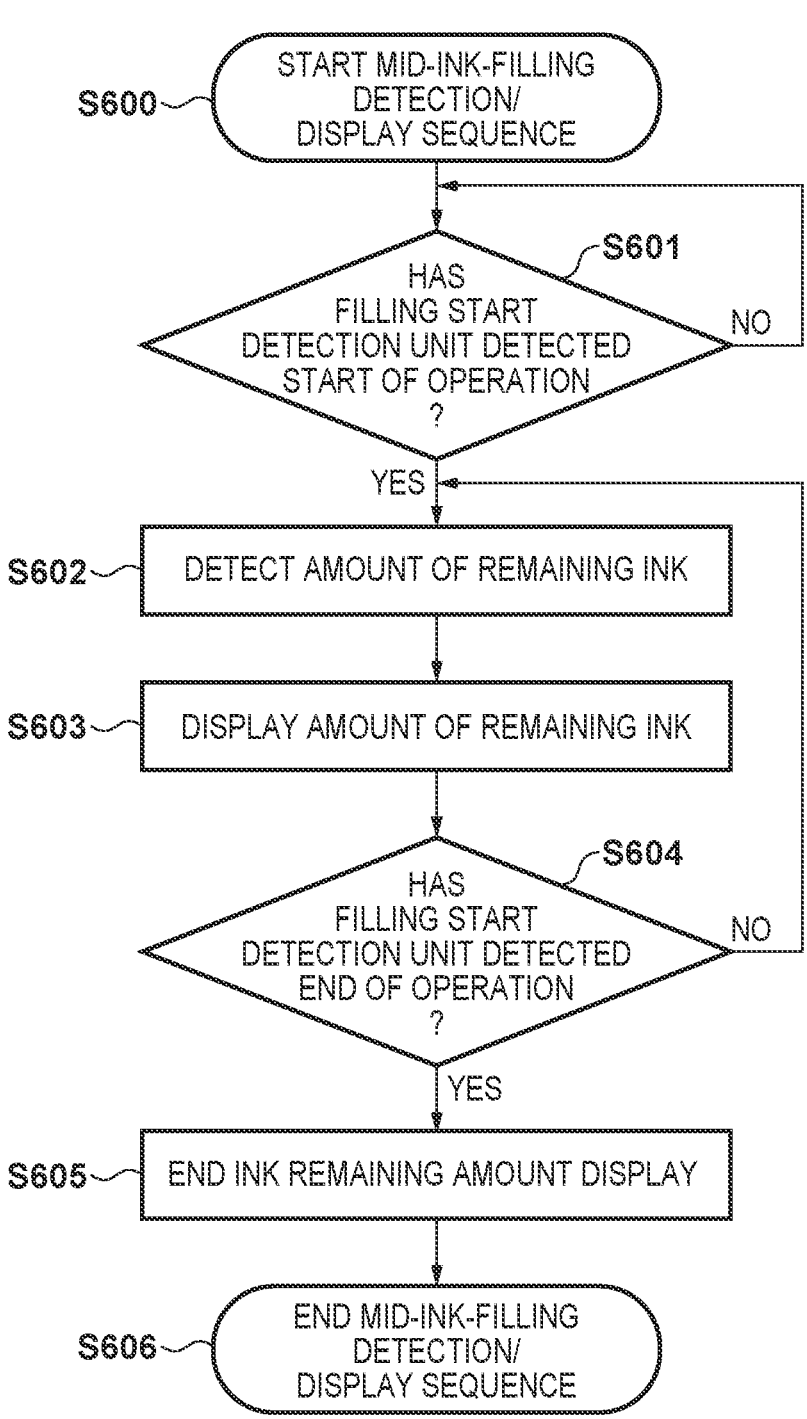

F I G. 9
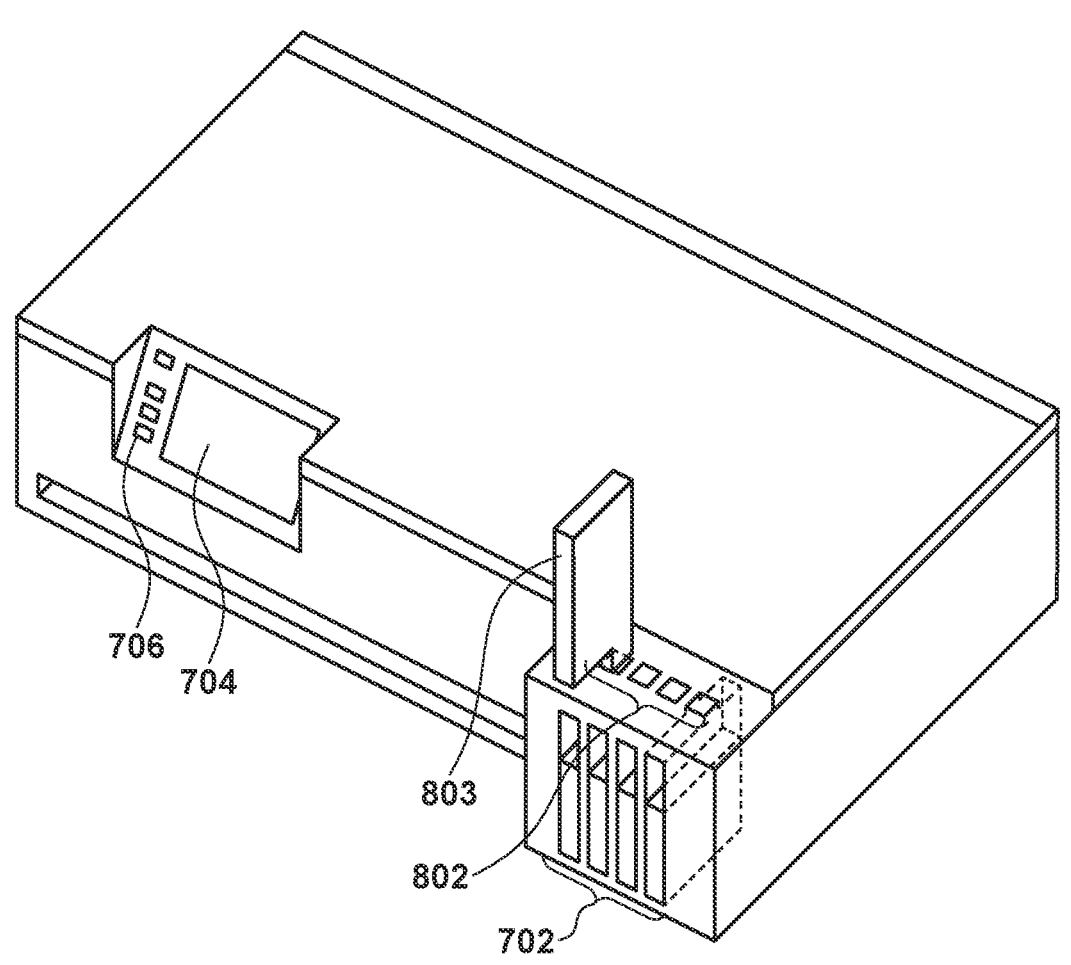

F I G. 10
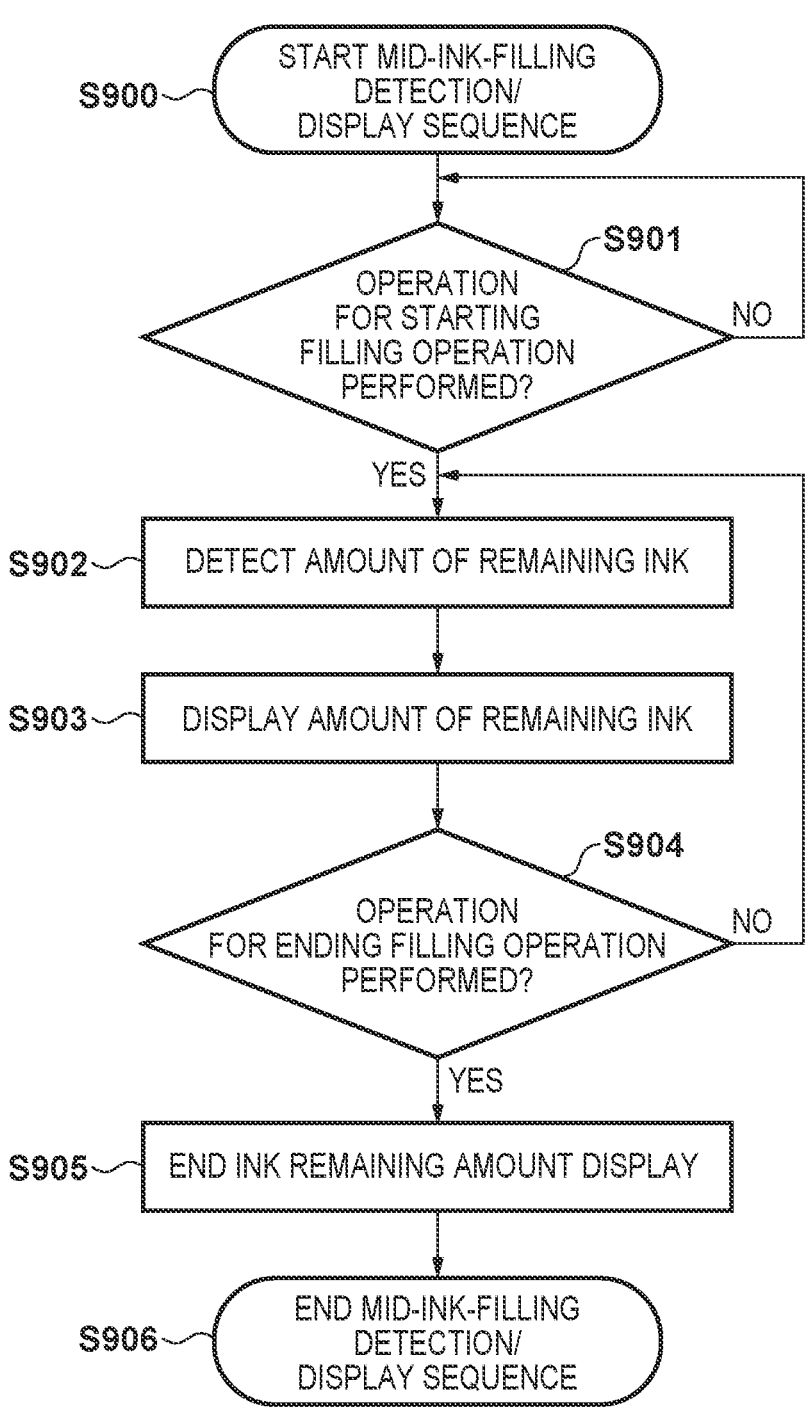

F I G. 11
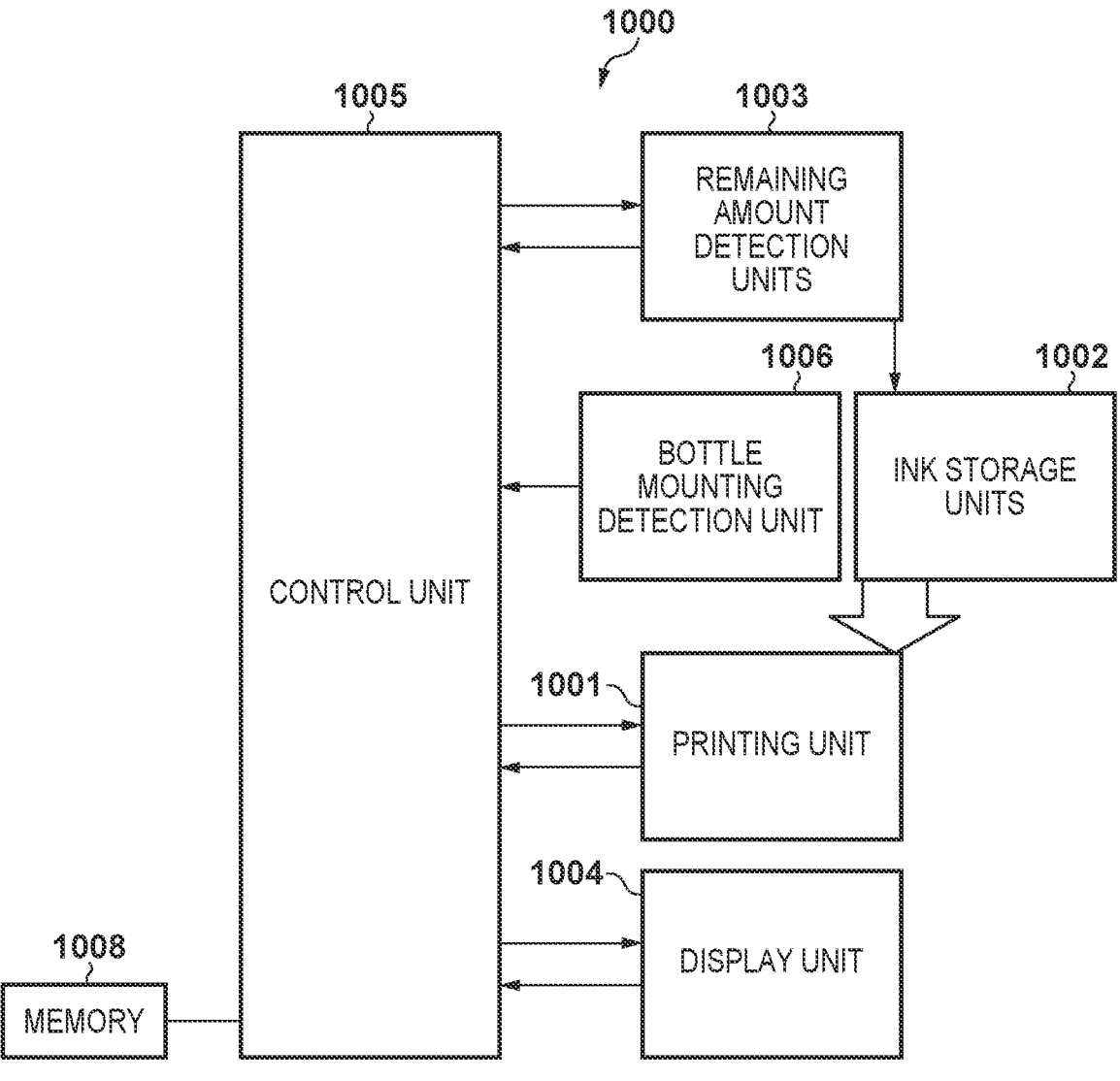

F I G. 12
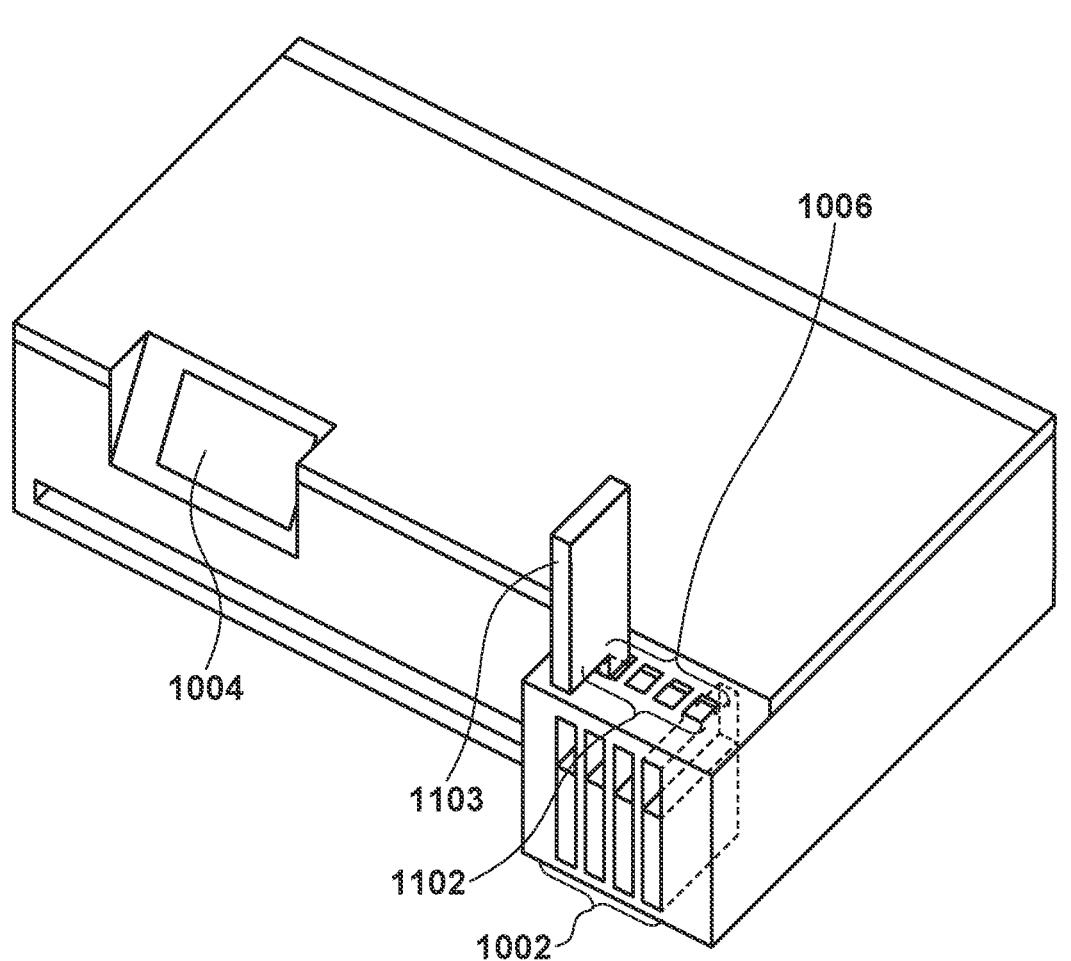

F I G. 14
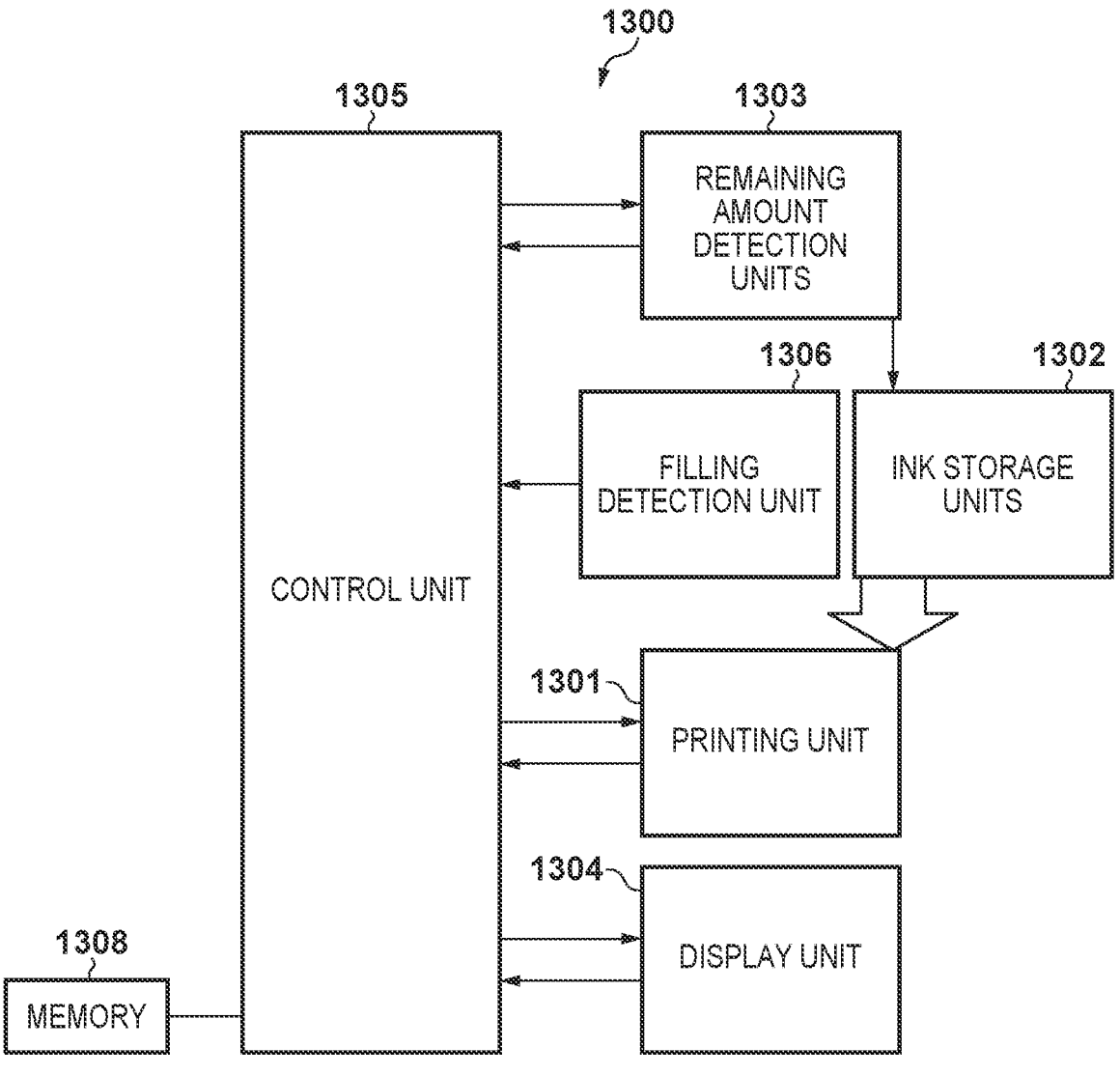

F I G. 15
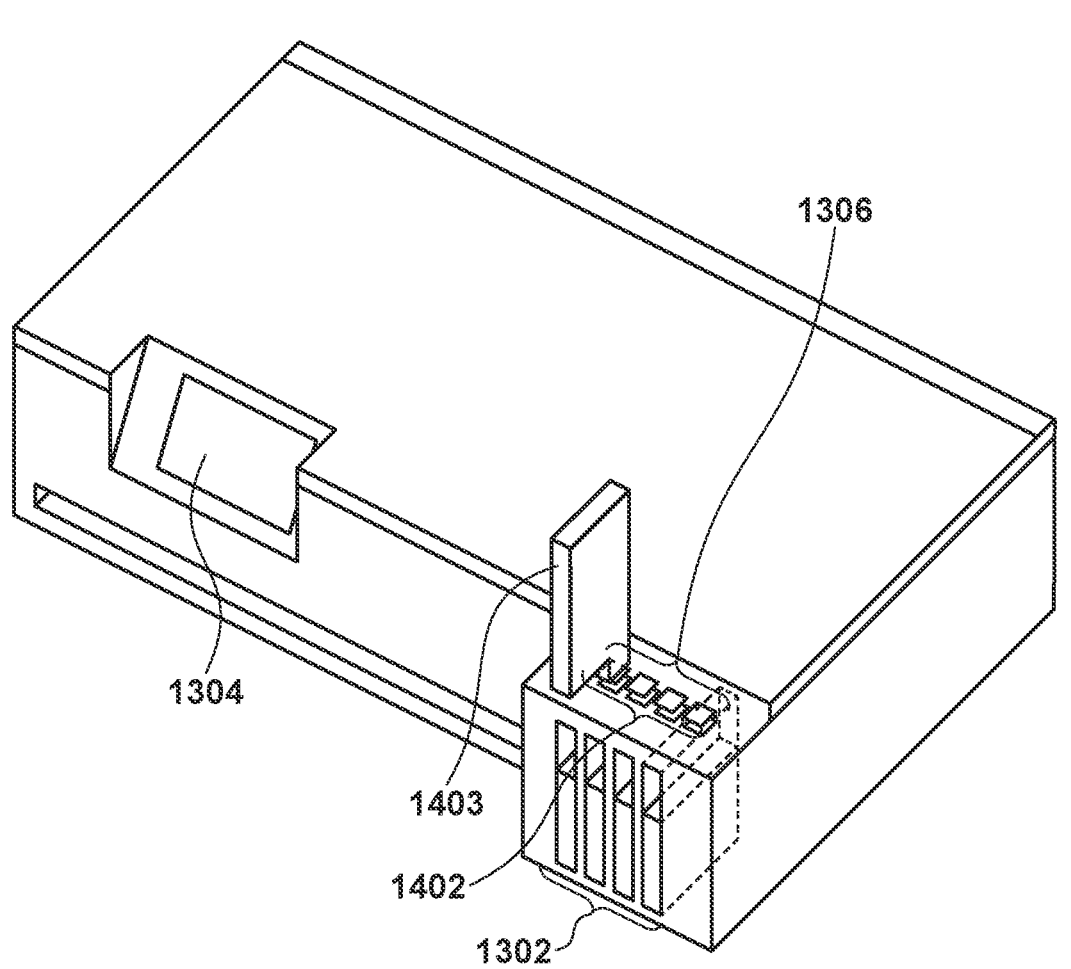

F I G.  16
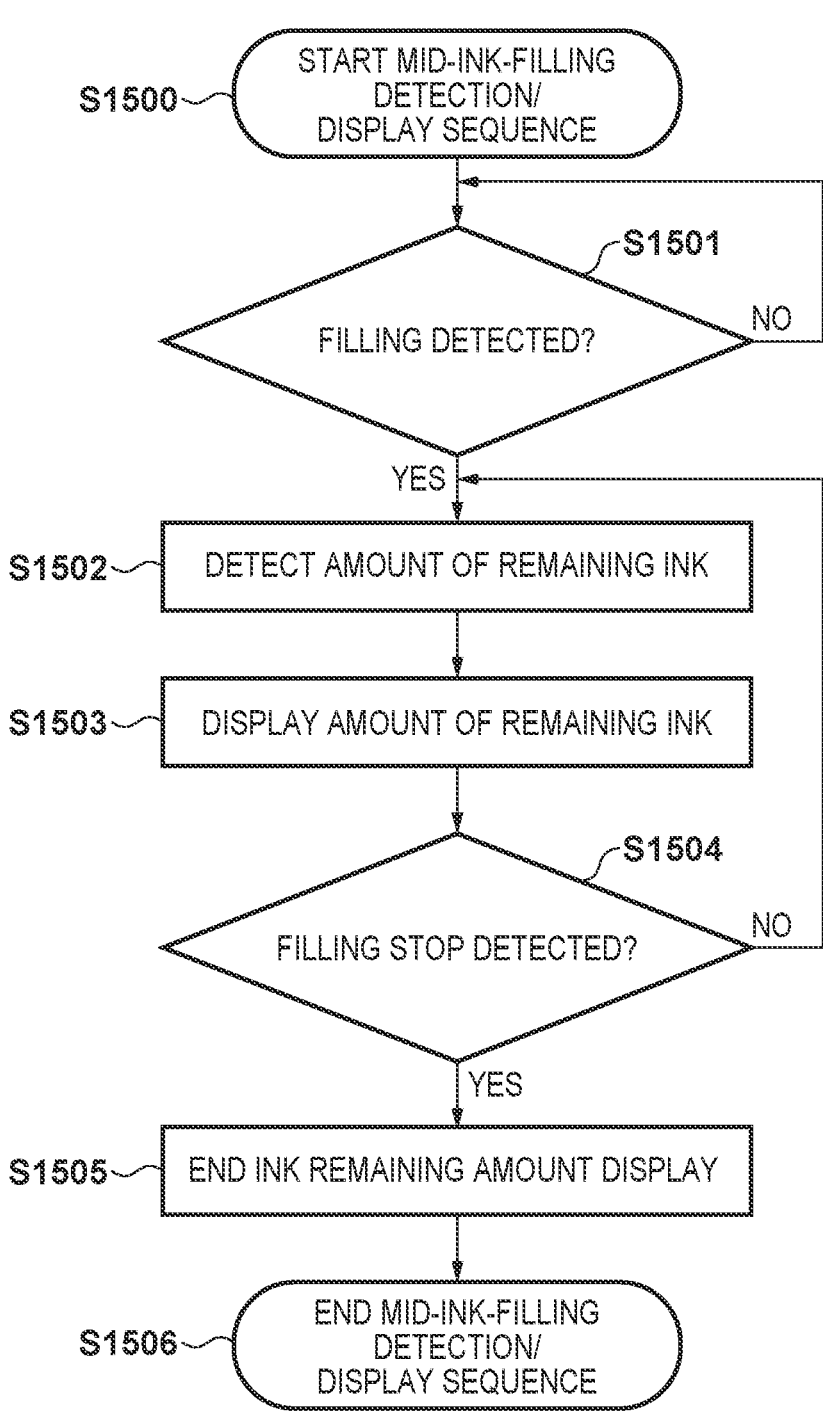

F I G.  18
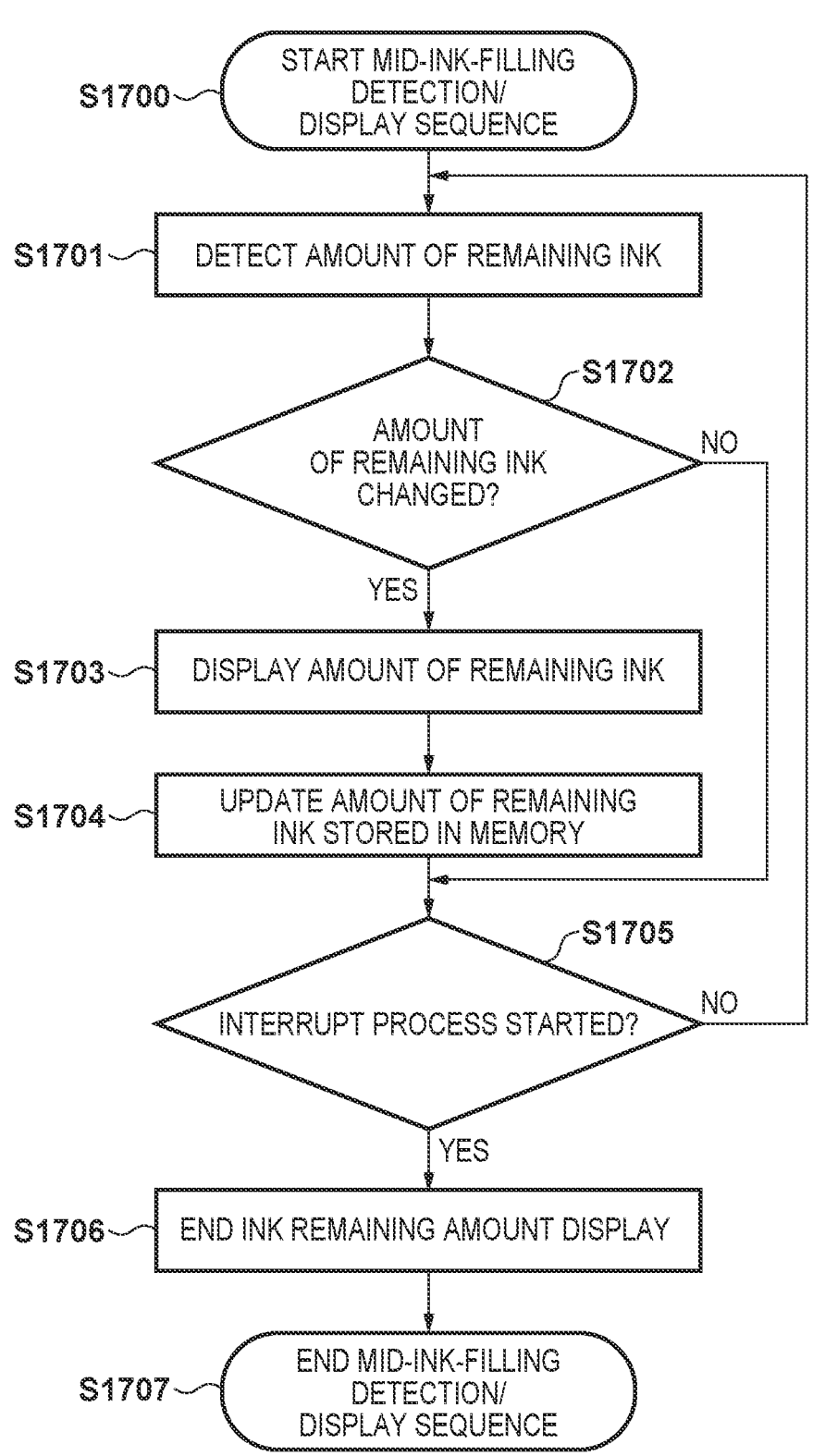

F I G.  19
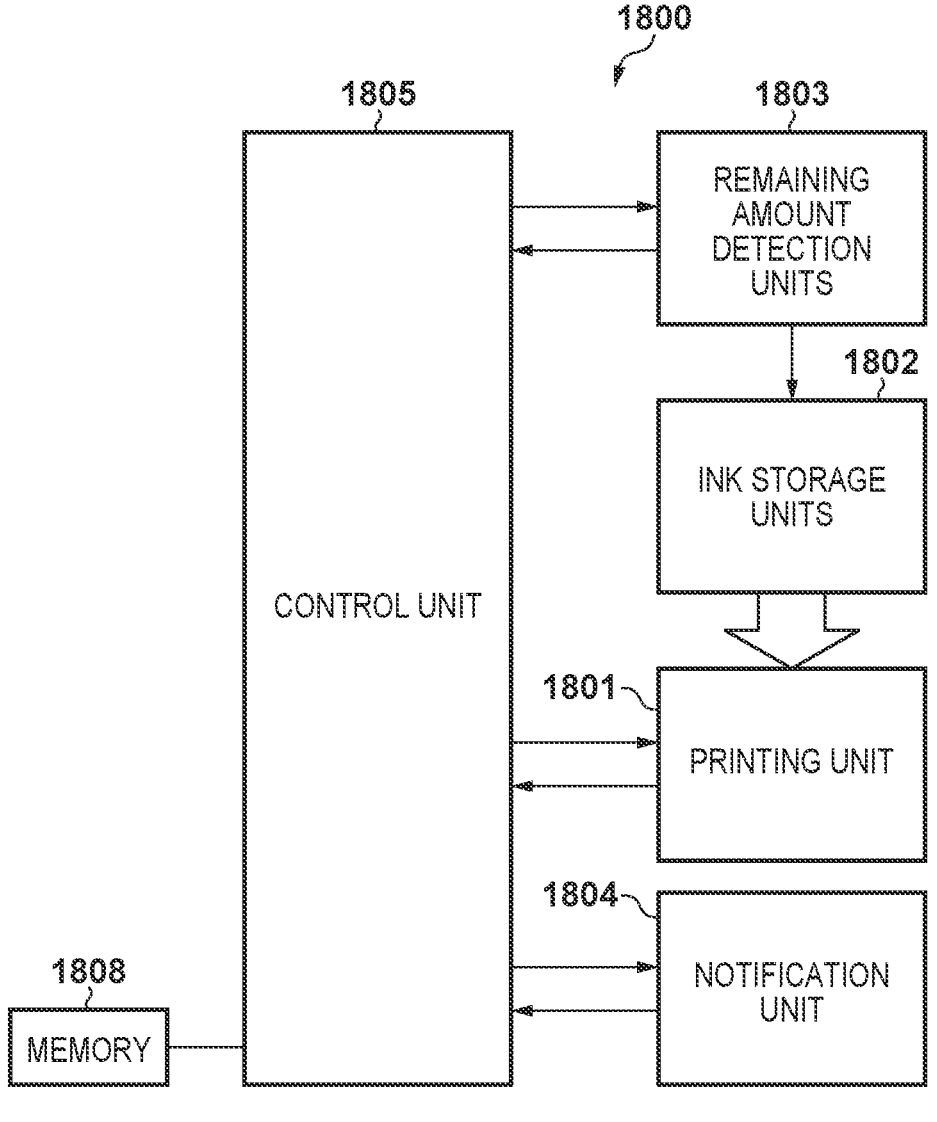

F I G. 21
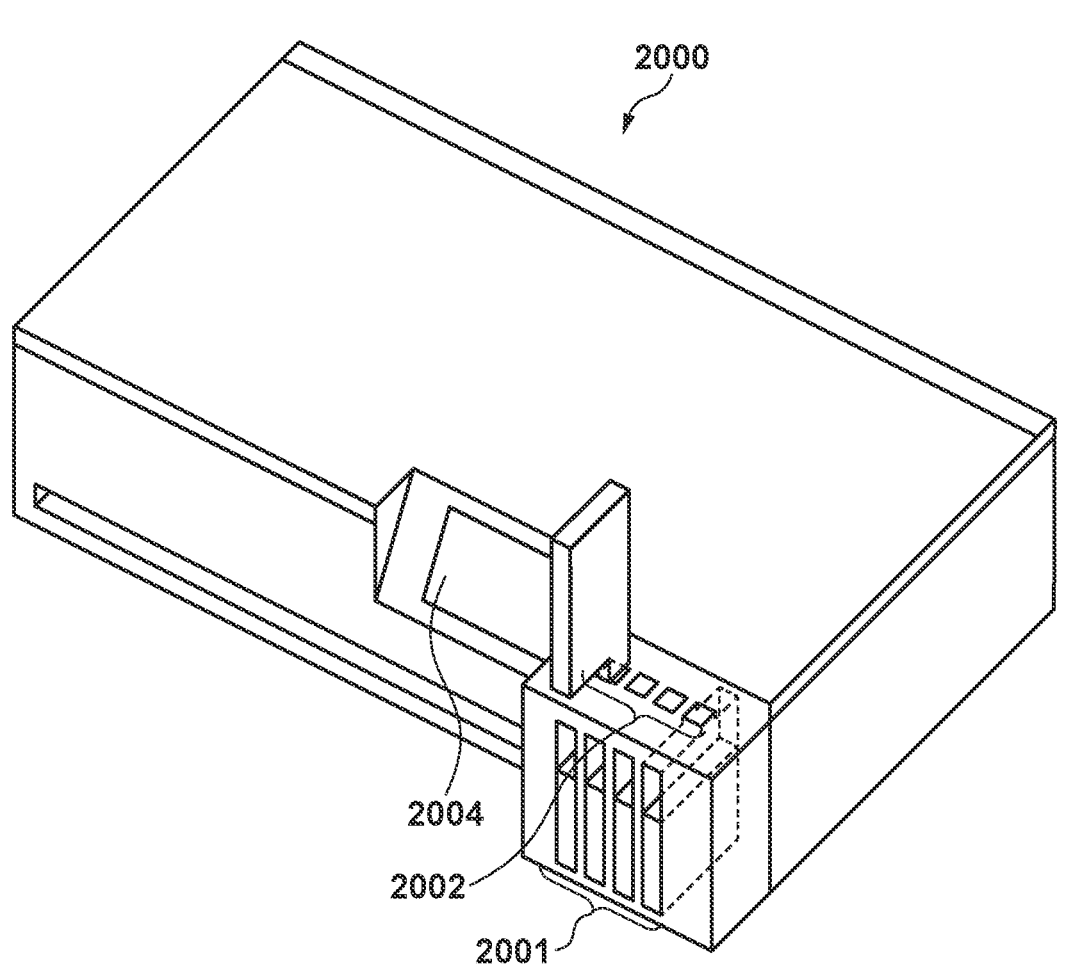

PRINTING APPARATUS, CONTROL METHOD THEREOF, AND STORAGE MEDIUM

BACKGROUND

Field

The present disclosure relates to a technique for displaying a remaining amount in a printing apparatus.

Description of the Related Art

Generally, printing apparatuses for printing an image by discharging ink from a printhead include a printhead, which discharges ink, and a plurality of ink storage units, which supply ink to the printhead and are for storing ink. The plurality of ink storage units are each configured to store a different type of ink.

As a printing apparatus including such a plurality of ink storage units, Japanese Patent Laid-Open No. 2017-001249 discloses a printing apparatus that includes a viewing window such that the amounts of remaining ink of the ink storage units, which are disposed in the apparatus, can be recognized. A user can recognize the amount of remaining ink from the viewing window when replenishing an ink storage unit with ink.

However, with the printing apparatus described in Japanese Patent Laid-Open No. 2017-001249, the user needs to look into the viewing window to recognize the amount of remaining ink when filling an ink storage unit with ink, and thus, it cannot necessarily be said that the operability is good. In addition, in a dark location, for example, visibility may further decrease. Therefore, it is difficult for the user to discern how much ink the ink storage unit has been filled with, and thus, it is difficult for the user to stop filling at a desired amount. In addition, even if the ink has reached a fill limit, the user may not notice it.

SUMMARY

The present disclosure has been made in view of the above-described problems and provides a printing apparatus capable of informing a user of an amount of liquid in a discernible manner.

According a first aspect of the present disclosure, a printing apparatus comprises a storage unit configured to store liquid to be supplied to a printhead, which performs printing by discharging the liquid, a liquid amount detection unit configured to detect an amount of the liquid stored in the storage unit, and a control unit configured to perform control to, in response to a start of liquid filling into the storage unit, provide notification of the amount of the liquid detected by the liquid amount detection unit.

According to a second aspect of the present disclosure, a method of controlling a printing apparatus including a storage unit configured to store a liquid to be supplied to a printhead, which performs printing by discharging the liquid, comprises detecting an amount of the liquid stored in the storage unit, and controlling, in response to a start of liquid filling into the storage unit, notification of the amount of the liquid detected by the liquid amount detection unit.

Further features of the present disclosure will become apparent from the following description of exemplary embodiments with reference to the attached drawings.

BRIEF DESCRIPTION OF THE DRAWINGS

FIG. 1 is a diagram illustrating a block configuration of a printing apparatus according to a first embodiment.

FIG. 2 is an external view of the printing apparatus according to the first embodiment.

FIG. 4 is a flowchart for explaining the operation of the printing apparatus according to the first embodiment.

FIG. 6 is an external view of the printing apparatus according to the second embodiment.

FIG. 7 is a flowchart for explaining the operation of the printing apparatus according to the second embodiment.

FIG. 9 is an external view of the printing apparatus according to the third embodiment.

FIG. 10 is a flowchart for explaining the operation of the printing apparatus according to the third embodiment.

FIG. 11 is a diagram illustrating a block configuration of the printing apparatus according to a fourth embodiment.

FIG. 12 is an external view of the printing apparatus according to the fourth embodiment.

FIG. 14 is a diagram illustrating a block configuration of the printing apparatus according to a fifth embodiment.

FIG. 15 is an external view of the printing apparatus according to the fifth embodiment.

FIG. 16 is a flowchart for explaining the operation of the printing apparatus according to the fifth embodiment.

FIG. 18 is a flowchart for explaining the operation of the printing apparatus according to the sixth embodiment.

FIG. 19 is a diagram illustrating a block configuration of the printing apparatus according to a seventh embodiment.

FIG. 21 is an external view of the printing apparatus according to an eighth embodiment.

DESCRIPTION OF THE EMBODIMENTS

Figure 3:
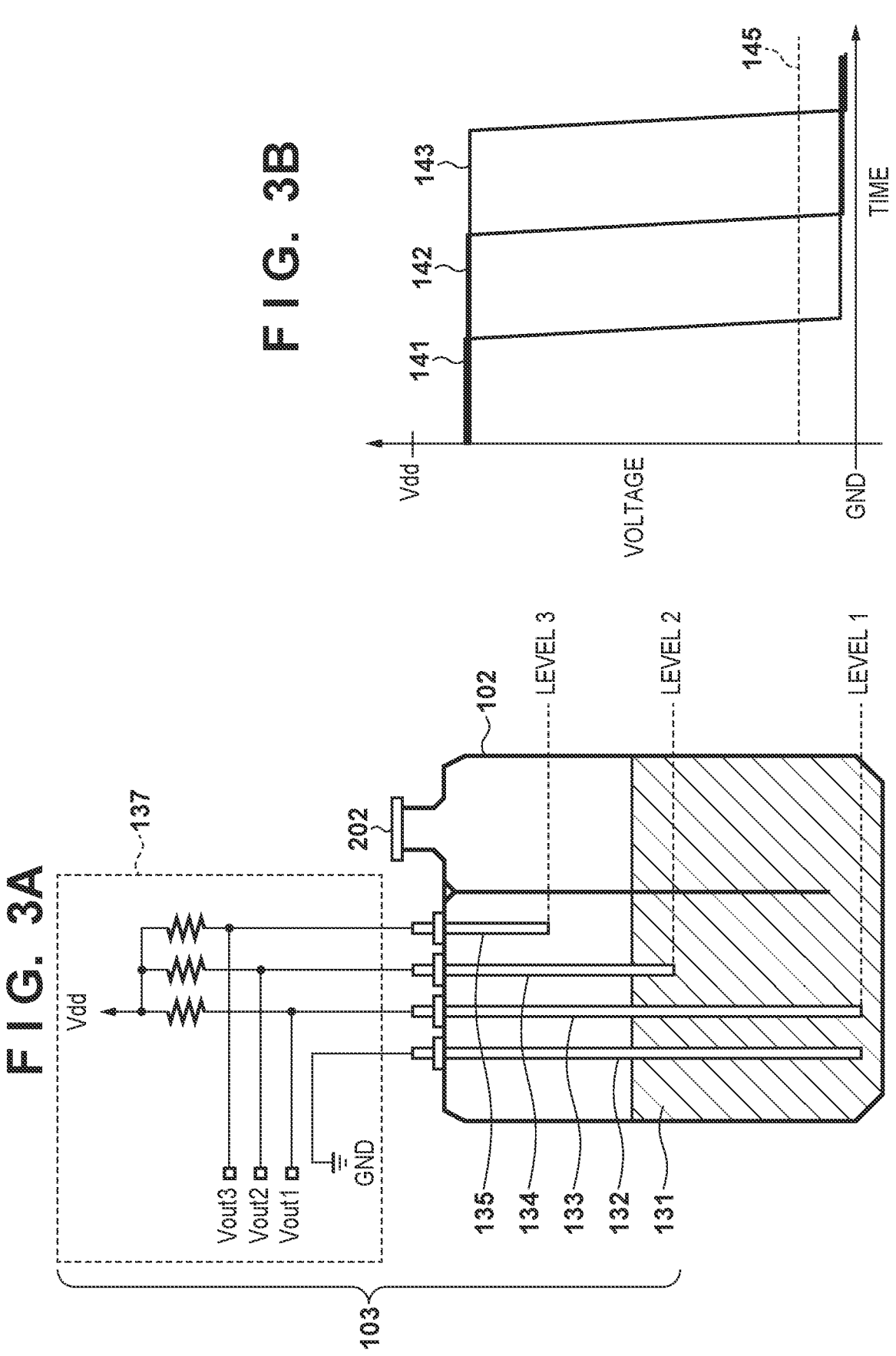
FIGS. 3A and 3B are diagrams illustrating a configuration of a remaining amount detection unit in the printing apparatus according to the first embodiment.

Hereinafter, embodiments will be described in detail with reference to the attached drawings. Note, the following embodiments are not seen to be limiting. Multiple features are described in the embodiments, but all such features may not be required, and multiple features can be combined as appropriate. Furthermore, in the attached drawings, the same reference numerals are given to the same or similar configurations, and redundant description thereof is omitted.

FIG. 1 is a diagram illustrating a block configuration of an inkjet printing apparatus 100, which is a first embodiment of a printing apparatus according to the present disclosure.

In FIG. 1, the inkjet printing apparatus (hereinafter, printing apparatus) 100 according to the present embodiment includes a printing unit 101, which includes a printhead for performing a printing operation by discharging ink (liquid) onto a target printing medium based on a print command, and ink storage units 102, which supply ink to the printing unit 101. The plurality of ink storage units 102 are provided to correspond to respective colors of ink. A remaining amount detection unit (liquid amount detection unit) 103, which detects the amount of remaining stored ink (amount of liquid), is disposed in each ink storage unit (liquid storage unit) 102, and a remaining amount detection result of the remaining amount detection unit 103, for example, is displayed on a display unit 104, which can provide notification of a remaining amount. In addition, a control unit 105, which is constituted by, for example, a microcomputer for controlling each unit of the printing apparatus 100, and a memory 108, which stores, for example, a program to be executed by the control unit 105, are disposed in the printing apparatus 100.

FIG. 2 is a diagram illustrating an appearance of the printing apparatus 100.

In FIG. 2, when filling with ink, a user inserts an ink bottle (ink container) 203 into a supply port 202, which is for supplying ink to the ink storage unit 102, to fill the ink storage unit 102 with ink. The remaining amount detection unit 103 is provided in the ink storage unit 102 and, once filling is started, detects the amount of remaining ink (amount of ink filled) in the ink storage unit 102 (liquid storage unit), and the amount of remaining ink is displayed on the display unit 104 based on the amount of remaining ink.

FIGS. 3A and 3B are schematic views illustrating a configuration of the remaining amount detection units 103, each disposed in their respective ink storage unit 102. FIG. 3A is a diagram illustrating the configuration of the remaining amount detection unit 103, and FIG. 3B is a graph illustrating behaviors of output voltages thereof.

In FIG. 3A, the remaining amount detection unit 103 includes a ground (GND) pin 132, a first electrode pin 133, a second electrode pin 134, a third electrode pin 135, and a detection circuit 137, which detects resistance values between the GND pin 132 and the respective electrode pins. The first electrode pin 133, the second electrode pin 134 and the third electrode pin 135 each have a different length (lower end position), with the first electrode pin 133 being the longest and the third electrode pin 135 being the shortest.

A user fills the ink storage unit 102 with ink 131 from the supply port 202. To detect a level corresponding to the amount of ink filled, a change in resistance values between the GND pin 132 and the first electrode pin 133, the second electrode pin 134, and the third electrode pin 135 is detected by the detection circuit 137.

The first electrode pin 133 corresponds to level 1, the second electrode pin 134 corresponds to level 2, and the third electrode pin 135 corresponds to level 3.

If the ink storage unit 102 is supplied with ink from when it is empty, when the supplied ink reaches level 1, the resistance value between the GND pin 132 and the first electrode pin 133 decreases due to electricity being conducted through the ink. Thus, as illustrated by a curve 141 of FIG. 3B, an output voltage of a power supply Vout1 decreases toward a ground potential (GND potential). Similarly, when the supplied ink reaches level 2, the resistance value between the GND pin 132 and the second electrode pin 134 decreases. Thus, as illustrated by a curve 142 of FIG. 3B, an output voltage of a power supply Vout2 decreases toward the GND potential. In addition, when the supplied ink reaches level 3, the resistance value between the GND pin 132 and the third electrode pin 135 decreases. Thus, as illustrated by a curve 143 of FIG. 3B, an output voltage of a power supply Vout3 decreases toward the GND potential. When the voltage drops and passes a threshold 145 illustrated in FIG. 3B, it can be detected that the ink has reached a respective level.

The configuration of the remaining amount detection unit 103 described here is also common to the remaining amount detection units according to the second to eighth embodiments, which will be described below.

FIG. 4 is a flowchart for explaining the operation of the printing apparatus 100. The operation of the flowchart is realized by the control unit 105 executing a program stored in the memory 108.

In step S300, a mid-ink-filling detection/display sequence is started by the user's operation on, for example, a menu display of the display unit 104. When the user starts filling the ink storage unit 102 with ink, in step S301, the control unit 105 detects the amount of remaining ink (amount of ink filled) in the ink storage unit 102, using the remaining amount detection unit 103. In step S302, the control unit 105 displays the amount of remaining ink detected in step S301 on the display unit 104. In step S303, the control unit 105 determines whether ink filling by the user has been completed. If ink filling is continued, the process returns to step S301 and ink remaining amount detection is continued. If ink filling has been completed, the process proceeds to step S304 and ink remaining amount display ends. In step S305, the control unit 105 ends the mid-ink-filling detection/display sequence. The user inputs information to the control unit 105 that ink filling has been completed by operating, for example, a filling complete switch disposed on an operation panel.

The display on the display unit 104 can be performed by an external device, such as a personal computer (PC) or a smartphone.

Regarding the display of the amount of remaining ink, for example, the amount of remaining ink corresponding to the position of a respective electrode pin provided in the remaining amount detection unit 103 is displayed in a stepwise manner. For example, if the ink surface is positioned between the lower end of the first electrode pin 133 and the lower end of the second electrode pin 134, displaying what is between the levels using gradation enables the user more easily recognize the amount of remaining ink. Such a display format is applicable to all embodiments described in the present disclosure.

Figure 5:
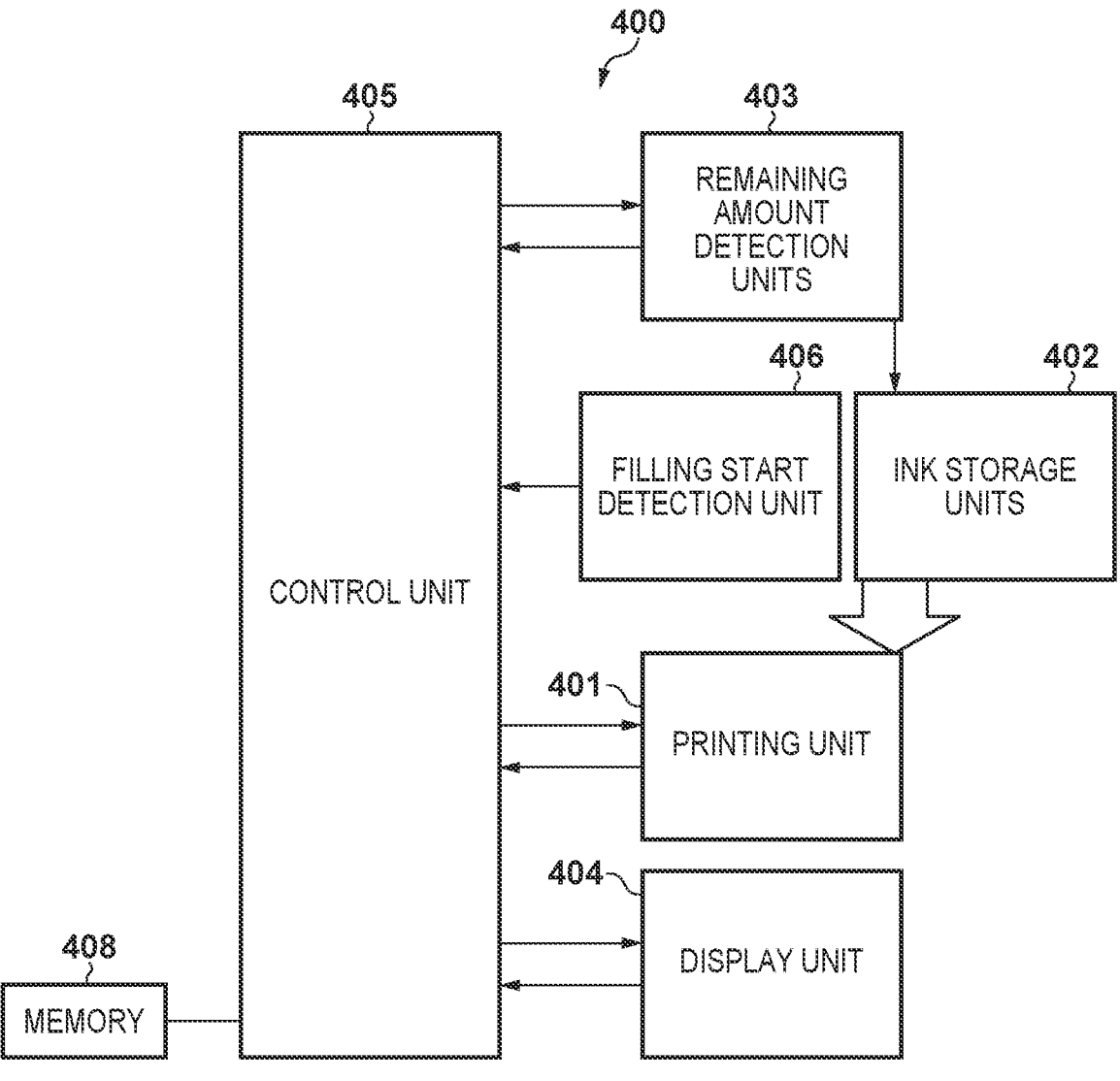
FIG. 5 is a diagram illustrating a block configuration of a printing apparatus according to a second embodiment.

FIG. 5 is a diagram illustrating a block configuration of an inkjet printing apparatus 400, which is a second embodiment of the printing apparatus according to the present disclosure.

In FIG. 5, the inkjet printing apparatus (hereinafter, printing apparatus) 400 according to the present embodiment includes a printing unit 401, which includes a printhead for performing a printing operation by discharging ink onto a target printing medium based on a print command, and ink storage units 402, which supply ink to the printing unit 401. A plurality of ink storage units 402 are provided to correspond to respective colors of ink. A remaining amount detection unit 403, which detects the amount of remaining stored ink, is disposed in each ink storage unit 402, and a remaining amount detection result of the remaining amount detection unit 403, for example, is displayed on a display unit 404. In addition, a filling start detection unit 406 (filling operation detection unit), which detects that a user has started an ink filling operation is disposed in the printing apparatus 400. In addition, a control unit 405, which is constituted by, for example, a microcomputer for controlling each unit of the printing apparatus 400, and a memory 408, which stores, for example, a program to be executed by the control unit 405, are disposed in the printing apparatus 400.

FIG. 6 is a diagram illustrating an appearance of the printing apparatus 400.

In FIG. 6, when filling with ink, the user inserts an ink bottle 503 into a supply port 502, which is for supplying ink to the ink storage unit 402, to fill the ink storage unit 402 with ink. The remaining amount detection unit 403 is provided in the ink storage unit 402. When the user opens the ink tank cover 505, the filling start detection unit (detection switch) 406 mounted on the ink tank cover 505 detects the start of the ink filling operation. In the present embodiment, the filling start detection unit 406 detects an open/closed state of the ink tank cover 505. The remaining amount detection unit 403 starts detecting the amount of remaining ink based on that detection signal, and the amount of remaining ink is displayed on the display unit 404 based on the amount of remaining ink.

FIG. 7 is a flowchart for explaining the operation of the printing apparatus 400. The operation of the flowchart is realized by the control unit 405 executing a program stored in the memory 408.

In step S600, a mid-ink-filling detection/display sequence is started by the user's operation on, for example, a menu display of the display unit 404. In step S601, the control unit 405 determines whether the user has opened the ink tank cover 505 and the filling start detection unit 406 has detected the start of the ink filling operation. If the start of the ink filling operation has been detected, the process proceeds to step S602. If the start of the ink filling operation has not been detected, the process continues to wait. In step S602, the control unit 405 detects the amount of remaining ink (amount of ink filled) in the ink storage unit 402, using the remaining amount detection unit 403. In step S603, the control unit 405 displays the amount of remaining ink detected in step S602 on the display unit 404. In step S604, the control unit 405 determines whether the ink tank cover 505 has been closed and the filling start detection unit 406 has detected the end of the ink filling operation. If the ink filling operation has not ended, the process returns to step S602 and ink remaining amount detection is continued. If the ink filling operation has ended, the process proceeds to step S605 and ink remaining amount display ends. In step S606, the control unit 405 ends the mid-ink-filling detection/display sequence. The display on the display unit 404 can be performed by an external device, such as a personal computer (PC) or a smartphone.

Figure 8:
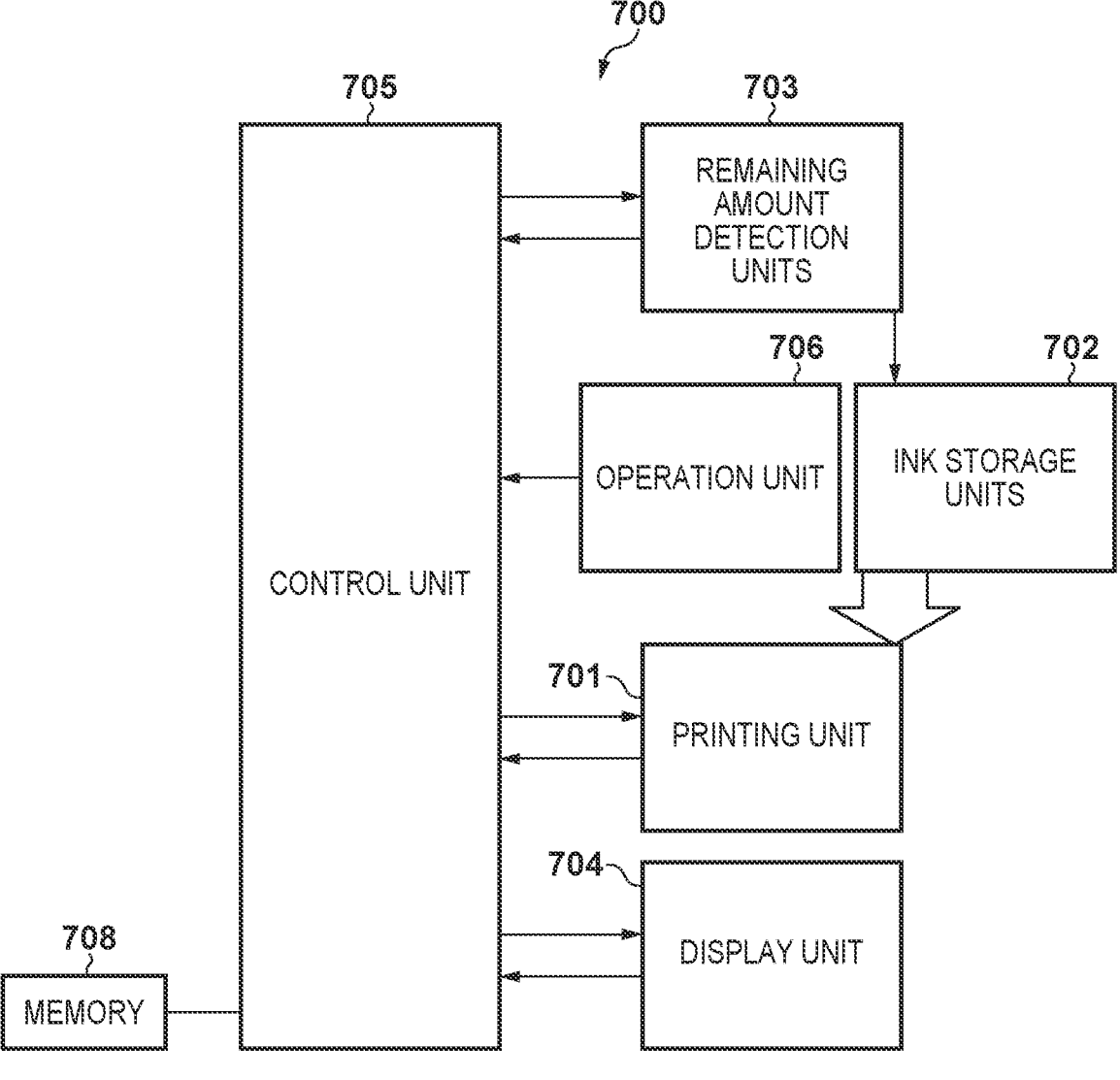
FIG. 8 is a diagram illustrating a block configuration of the printing apparatus according to a third embodiment.

FIG. 8 is a diagram illustrating a block configuration of an inkjet printing apparatus 700, which is a third embodiment of the printing apparatus according to the present disclosure.

In FIG. 8, the inkjet printing apparatus (hereinafter, printing apparatus) 700 according to the present embodiment includes a printing unit 701, which includes a printhead for performing a printing operation by discharging ink onto a target printing medium based on a print command, and ink storage units 702, which supply ink to the printing unit 701. A plurality of ink storage units 702 are provided to correspond to respective colors of ink. A remaining amount detection unit 703, which detects the amount of remaining stored ink, is disposed in each ink storage unit 702, and a remaining amount detection result of the remaining amount detection unit 703, for example, is displayed on a display unit 704. An operation unit 706 on which the user performs an operation for transitioning to the ink filling operation is disposed in the printing apparatus 700. In addition, a control unit 705, which is constituted by, for example, a microcomputer for controlling each unit of the printing apparatus 700, and a memory 708, which stores, for example, a program to be executed by the control unit 705, are disposed in the printing apparatus 700.

FIG. 9 is a diagram illustrating an appearance of the printing apparatus 700.

In FIG. 9, when filling with ink, a user inserts an ink bottle 803 into a supply port 802, which is for supplying ink to the ink storage unit 702, to fill the ink storage unit 702 with ink. The remaining amount detection unit 703 is provided in the ink storage unit 702. When the user performs the operation for transitioning to the ink filling operation on the operation unit 706, the remaining amount detection unit 703 starts detecting the remaining amount of ink, and the amount of remaining ink is displayed on the display unit 704 based on the amount of remaining ink.

FIG. 10 is a flowchart for explaining the operation of the printing apparatus 700. The operation of the flowchart is realized by the control unit 705 executing a program stored in the memory 708.

In step S900, a mid-ink-filling detection/display sequence is started by the user's operation on, for example, a menu display of the display unit 704. In step S901, the control unit 705 determines whether the user has performed the operation for transitioning to the ink filling operation on the operation unit 706. If the operation for transitioning to the ink filling operation has been performed, the process proceeds to step S902. If the operation for transitioning to the ink filling operation has not been performed, the process continues to wait. In step S902, the control unit 705 detects the amount of remaining ink (amount of ink filled) in the ink storage unit 702, using the remaining amount detection unit 703. In step S903, the control unit 705 displays the amount of remaining ink detected in step S902 on the display unit 704. In step S904, the control unit 705 determines whether the user has performed an operation for ending the ink filling operation on the operation unit 706. If the ink filling operation has not ended, the process returns to step S902 and ink remaining amount detection continues. If the ink filling operation has ended, the process proceeds to step S905 and ink remaining amount display ends. In step S906, the control unit 705 ends the mid-ink-filling detection/display sequence. The display on the display unit 704 can be performed by an external device, such as a personal computer (PC) or a smartphone.

FIG. 11 is a diagram illustrating a block configuration of an inkjet printing apparatus 1000, which is a fourth embodiment of the printing apparatus according to the present disclosure.

In FIG. 11, the inkjet printing apparatus (hereinafter, printing apparatus) 1000 according to the present embodiment includes a printing unit 1001, which includes a printhead for performing a printing operation by discharging ink onto a target printing medium based on a print command, and ink storage units 1002, which supply ink to the printing unit 1001. A plurality of ink storage units 1002 are provided to correspond to respective colors of ink. A remaining amount detection unit 1003, which detects the amount of remaining stored ink, is disposed in each ink storage unit 1002, and a remaining amount detection result of the remaining amount detection unit 1003, for example, is displayed on a display unit 1004. A bottle mounting detection unit 1006, which detects that an ink bottle for filling the ink storage unit 1002 with ink has been mounted, is disposed in the printing apparatus 1000. In addition, a control unit 1005, which is constituted by, for example, a microcomputer for controlling each unit of the printing apparatus 1000, and a memory 1008, which stores, for example, a program to be executed by the control unit 1005, are disposed in the printing apparatus 1000.

FIG. 12 is a diagram illustrating an appearance of the printing apparatus 1000.

In FIG. 12, when filling with ink, a user inserts an ink bottle 1103 into a supply port 1102, which is for supplying ink to the ink storage unit 1002, to fill the ink storage unit 1002 with ink. The remaining amount detection unit 1003 is provided in the ink storage unit 1002. The supply port 1102 is provided with the bottle mounting detection unit (detection switch) 1006, and when the ink bottle 1103 is mounted, the bottle mounting detection unit 1006 detects the mounting of the ink bottle. The remaining amount detection unit 1003 starts detecting the amount of remaining ink based on that detection signal, and the amount of remaining ink is displayed on the display unit 1004 based on the amount of remaining ink.

Figure 13:
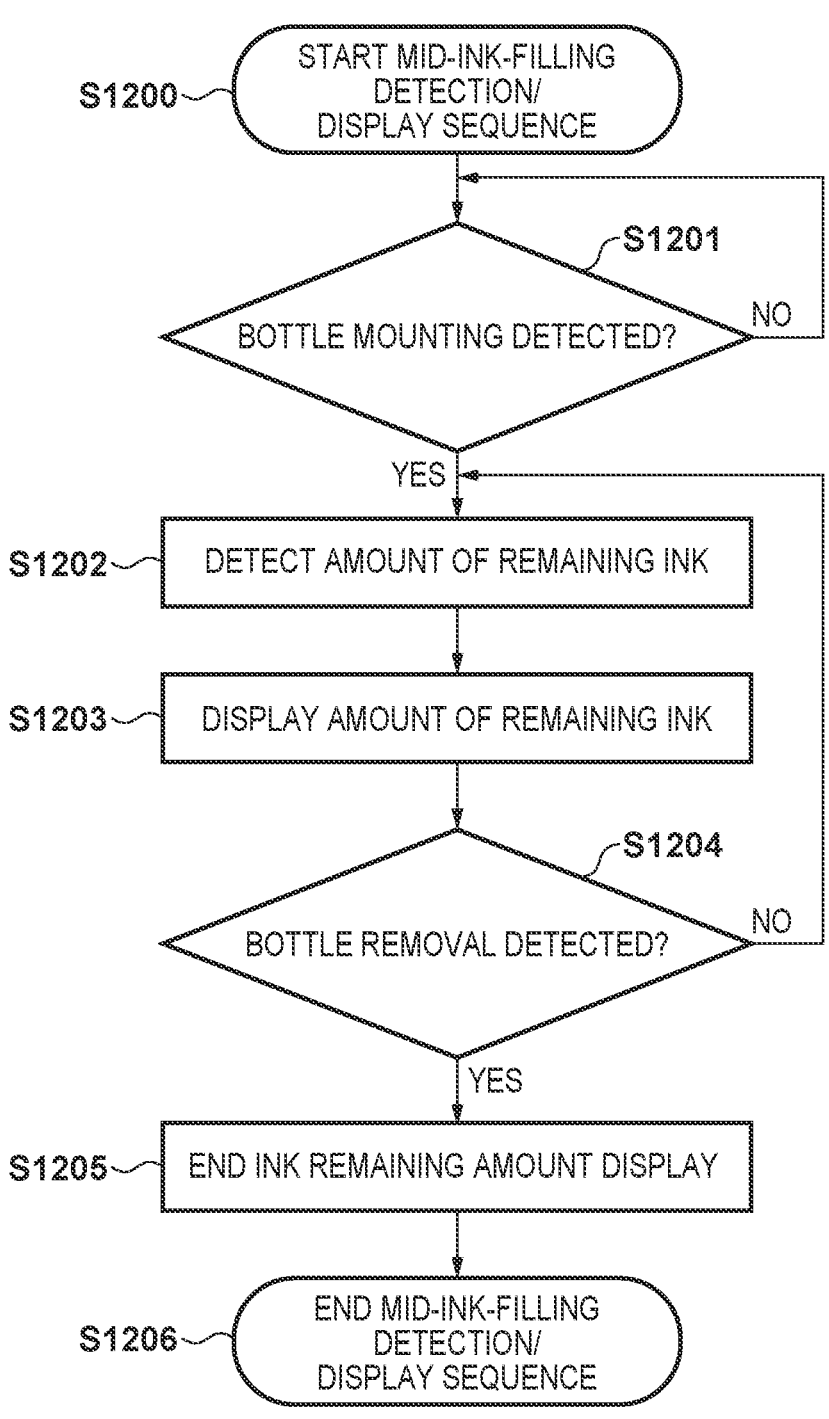
FIG. 13 is a flowchart for explaining the operation of the printing apparatus according to the fourth embodiment.

FIG. 13 is a flowchart for explaining the operation of the printing apparatus 1000. The operation of the flowchart is realized by the control unit 1005 executing a program stored in the memory 1008.

In step S1200, a mid-ink-filling detection/display sequence is started by the user's operation on, for example, a menu display of the display unit 1004. In step S1201, the control unit 1005 determines whether the bottle mounting detection unit 1006 has detected that the user has mounted the ink bottle 1103 onto the supply port 1102. If the mounting of the ink bottle 1103 has been detected, the process proceeds to step S1202. If the mounting of the ink bottle 1103 has not been detected, the process continues to wait. In step S1202, the control unit 1005 detects the amount of remaining ink (amount of ink filled) in the ink storage unit 1002, using the remaining amount detection unit 1003. In step S1203, the control unit 1005 displays the amount of remaining ink detected in step S1202 on the display unit 1004. In step S1204, the control unit 1005 determines whether the bottle mounting detection unit 1006 has detected that the ink bottle 1103 has been removed from the supply port 1102. If the ink bottle 1103 has not been removed, the process returns to step S1202 and ink remaining amount detection is continued. If ink bottle has been removed, the process proceeds to step S1205 and ink remaining amount display ends. In step S1206, the control unit 1005 ends the mid-ink-filling detection/display sequence. The display on the display unit 1004 can be performed by an external device, such as a personal computer (PC) or a smartphone.

FIG. 14 is a diagram illustrating a block configuration of an inkjet printing apparatus 1300, which is a fifth embodiment of the printing apparatus according to the present disclosure.

In FIG. 14, the inkjet printing apparatus (hereinafter, printing apparatus) 1300 according to the present embodiment includes a printing unit 1301, which includes a printhead for performing a printing operation by discharging ink onto a target printing medium based on a print command, and ink storage units 1302, which supply ink to the printing unit 1301. A plurality of ink storage units 1302 are provided to correspond to respective colors of ink. A remaining amount detection unit 1303, which detects the amount of remaining stored ink, is disposed in each ink storage unit 1302, and a remaining amount detection result of the remaining amount detection unit 1303, for example, is displayed on a display unit 1304. A filling detection unit 1306, which detects that the ink storage unit 1302 is being filled with ink, is disposed in the printing apparatus 1300. In addition, a control unit 1305, which is constituted by, for example, a microcomputer for controlling each unit of the printing apparatus 1300, and a memory 1308, which stores, for example, a program to be executed by the control unit 1305, are disposed in the printing apparatus 1300.

FIG. 15 is a diagram illustrating an appearance of the printing apparatus 1300.

In FIG. 15, when filling with ink, a user inserts an ink bottle 1403 into a supply port 1402, which is for supplying ink to the ink storage unit 1302, to fill the ink storage unit

1302 with ink. The remaining amount detection unit 1303 is provided in the ink storage unit 1302. The ink storage unit 1302 is provided with the filling detection unit (detection switch) 1306, which detects ink filling, and when ink starts flowing into the ink storage unit 1302, ink filling is detected. The filling detection unit 1306 includes, for example, an electrode pin or a flow amount detection sensor (not illustrated), which is disposed near the supply port 1402 or in the ink storage unit 1302. The remaining amount detection unit 1303 starts detecting the amount of remaining ink based on that detection signal, and the amount of remaining ink is displayed on the display unit 1304 based on the amount of remaining ink.

FIG. 16 is a flowchart for explaining the operation of the printing apparatus 1300. The operation of the flowchart is realized by the control unit 1305 executing a program stored in the memory 1308.

In step S1500, a mid-ink-filling detection/display sequence is started by the user's operation on, for example, a menu display of the display unit 1304. In step S1501, the control unit 1305 determines whether the filling detection unit 1306 has detected ink filling by ink flowing into the ink storage unit 1302. If ink filling has been detected, the process proceeds to step S1502. If ink filling has not been detected, the process continues to wait. In step S1502, the control unit 1305 detects the amount of remaining ink (amount of ink filled) in the ink storage unit 1302, using the remaining amount detection unit 1303. In step S1503, the control unit 1305 displays the amount of remaining ink detected in step S1502 on the display unit 1304. In step S1504, the control unit 1305 determines whether the filling detection unit 1306 has detected a stop of ink filling. If a stop of ink filling has not been detected, the process returns to step S1502 and ink remaining amount detection is continued. If a stop of ink filling has been detected, the process proceeds to step S1505 and ink remaining amount display ends. In step S1506, the control unit 1305 ends the mid-ink-filling detection/display sequence. The display on the display unit 1304 can be performed by an external device, such as a personal computer (PC) or a smartphone.

Figure 17:
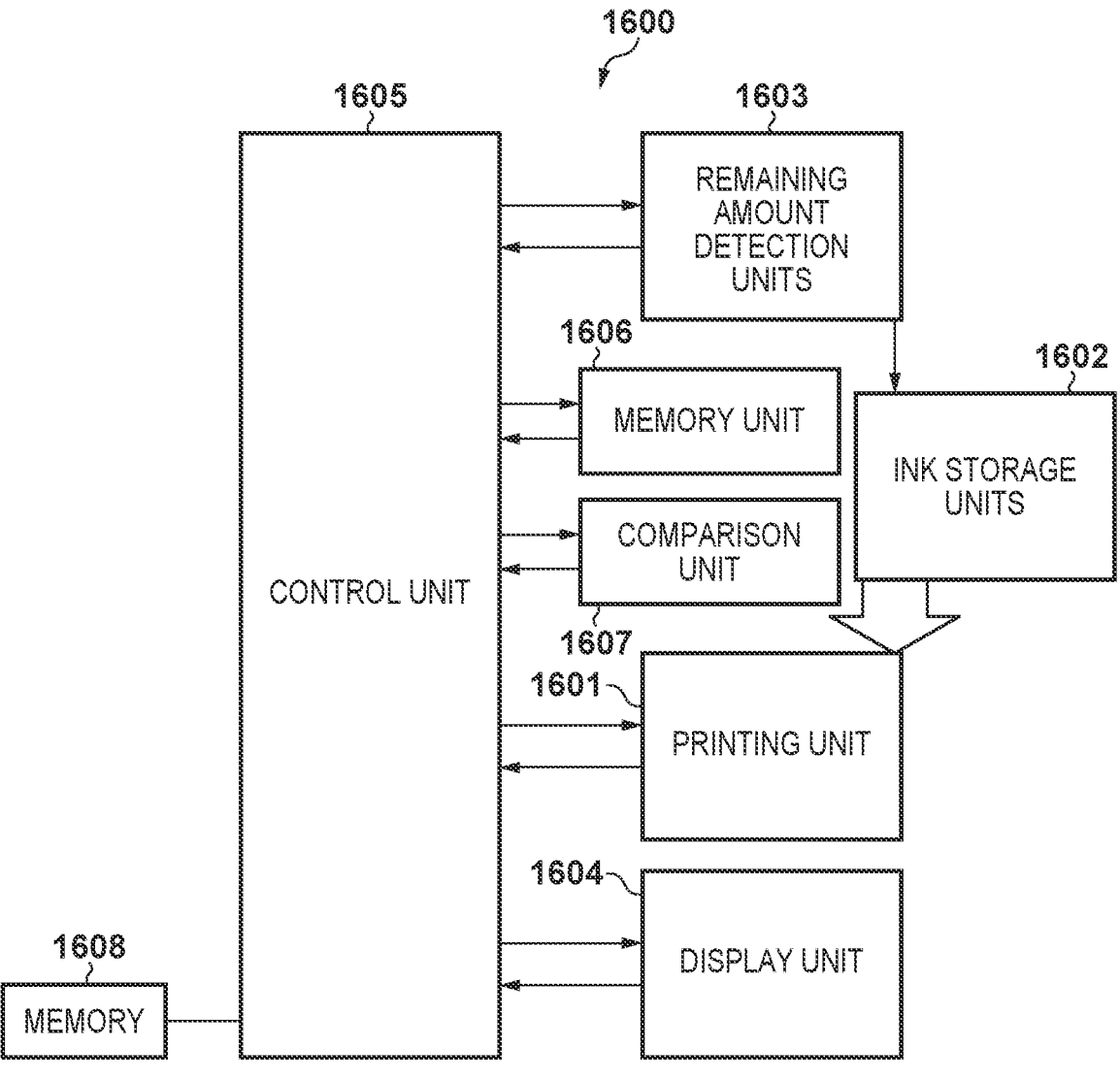
FIG. 17 is a diagram illustrating a block configuration of the printing apparatus according to a sixth embodiment.

FIG. 17 is a diagram illustrating a block configuration of an inkjet printing apparatus 1600, which is a sixth embodiment of the printing apparatus according to the present disclosure.

In FIG. 17, the inkjet printing apparatus (hereinafter, printing apparatus) 1600 according to the present embodiment includes a printing unit 1601, which includes a printhead for performing a printing operation by discharging ink onto a target printing medium based on a print command, and ink storage units 1602, which supply ink to the printing unit 1601. A plurality of ink storage units 1602 are provided to correspond to respective colors of ink. A remaining amount detection unit 1603, which detects the amount of remaining stored ink, is disposed in each ink storage unit 1602, and a remaining amount detection result of the remaining amount detection unit 1603, for example, is displayed on a display unit 1604. In addition, a memory unit 1606, which is for holding a remaining amount detection result, and a comparison unit 1607, which is for comparing remaining amount detection results, are disposed in the printing apparatus 1600. In addition, a control unit 1605, which is constituted by, for example, a microcomputer for controlling each unit of the printing apparatus 1600, and a memory 1608, which stores, for example, a program to be executed by the control unit 1605, are disposed in the printing apparatus 1600.

FIG. 18 is a flowchart for explaining the operation of the printing apparatus 1600. The operation of the flowchart is realized by the control unit 1605 executing a program stored in the memory 1608.

In step S1700, a mid-ink-filling detection/display sequence is started by the user's operation on, for example, a menu display of the display unit 1604. In step S1701, the control unit 1605 detects the amount of remaining ink (amount of ink filled) in the ink storage unit 1602, using the remaining amount detection unit 1603. In step S1702, the control unit 1605 compares a detection result of the amount of remaining ink obtained in step S1701 and a previous (last) detection result of the amount of remaining ink stored in the memory unit 1606, using the comparison unit 1607. Then, if the amount of remaining ink has changed, it is determined that ink is flowing in, and the process proceeds to step S1703. If the amount of remaining ink has not changed, the process proceeds to step S1705. In step S1703, the control unit 1605 displays the latest amount of remaining ink on the display unit 1604. In step S1704, the amount of remaining ink stored in the memory unit 1606 is updated to a new detection result. In step S1705, the control unit 1605 determines whether an interrupt process has started. The interrupt process includes, for example, issuance of an instruction for ending ink filling by the user operating on the display unit 1604. If the interrupt process is not started, the process returns to step S1701 and ink remaining amount detection is continued. If the interrupt process is started, the process proceeds to step S1706 and ink remaining amount display ends. In step S1707, the control unit 1605 ends the mid-ink-filling detection/display sequence. The display on the display unit 1604 can be performed by an external device, such as a personal computer (PC) or a smartphone. Regarding step S1702 and step S1703, the order can be switched or the steps can be executed at the same time.

FIG. 19 is a diagram illustrating a block configuration of an inkjet printing apparatus 1800, which is a seventh embodiment of the printing apparatus according to the present disclosure.

In FIG. 19, the inkjet printing apparatus (hereinafter, printing apparatus) 1800 according to the present embodiment includes a printing unit 1801, which includes a printhead for performing a printing operation by discharging ink onto a target printing medium based on a print command, and ink storage units 1802, which supply ink to the printing unit 1801. A plurality of ink storage units 1802 are provided to correspond to respective colors of ink. A remaining amount detection unit 1803, which detects the amount of remaining stored ink, is disposed in each ink storage unit 1802, and a notification unit 1804, which notifies a remaining amount detection result of the remaining amount detection unit 1803, is also provided. In addition, a control unit 1805, which is constituted by, for example, a microcomputer for controlling each unit of the printing apparatus 1800, and a memory 1808, which stores, for example, a program to be executed by the control unit 1805, are disposed in the printing apparatus 1800.

Figure 20:
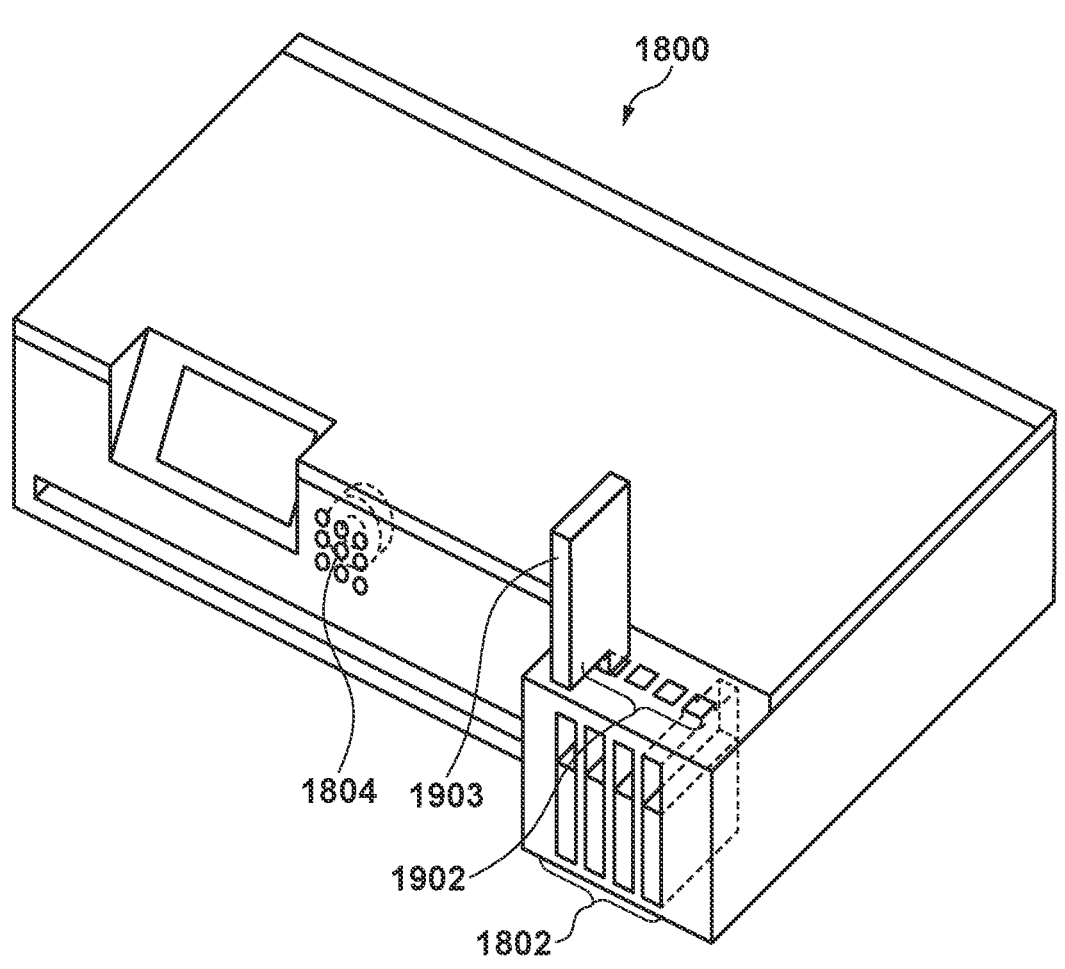
FIG. 20 is an external view of the printing apparatus according to the seventh embodiment.

FIG. 20 is a diagram illustrating an appearance of the printing apparatus 1800.

In FIG. 20, when filling with ink, a user inserts an ink bottle 1903 into a supply port 1902, which is for supplying ink to the ink storage unit 1802, to fill the ink storage unit 1802 with ink. The remaining amount detection unit 1803 is provided in the ink storage unit 1802 and, once ink filling is started, detects the amount of remaining ink (amount of ink filled), and the notification unit 1804, which is constituted by, for example, a speaker, provides notification of the amount of remaining ink based on the amount of remaining ink. An external device, such as a personal computer (PC), a smartphone, or a speaker, can be used as the notification unit 1804 of FIG. 20.

FIG. 21 is an external view of an inkjet printing apparatus 2000, which is an eighth embodiment of the printing apparatus according to the present disclosure.

As illustrated in FIG. 21, for example, a display unit 2004 can be disposed near ink storage units 2001 and supply ports 2002.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2022-207245, filed Dec. 23, 2022, which is hereby incorporated by reference herein in its entirety.

What is claimed is:

1. A printing apparatus comprising:
   a storage unit configured to store liquid to be supplied to a printhead, which performs printing by discharging the liquid;
   a liquid amount detection unit configured to detect an amount of the liquid stored in the storage unit;
   a filling detection unit configured to detect a start of liquid filling into the storage unit based on a flow of the liquid; and
   a control unit configured to perform control to provide notification of the amount of the liquid detected by the liquid amount detection unit, in response to the filling detection unit detecting the start of liquid filling.

2. The printing apparatus according to claim 1, further comprising a display unit configured to display the amount of the liquid.

3. The printing apparatus according to claim 1, further comprising a speaker configured to provide the notification of the amount of the liquid.

4. The printing apparatus according to claim 1, further comprising a filling detection unit configured to detect that liquid filling into the storage unit has started.

5. The printing apparatus according to claim 1, further comprising an operation unit configured to be operated by a user.

6. The printing apparatus according to claim 5, wherein in a case where an operation for starting filling is performed on the operation unit, the control unit controls providing notification of the amount of the liquid.

7. The printing apparatus according to claim 1, further comprising a mounting detection unit configured to detect that a container for liquid filling has been mounted onto the storage unit.

8. The printing apparatus according to claim 7, wherein in a case where mounting of the container has been detected by the mounting detection unit, the control unit controls providing notification of the amount of the liquid.

9. The printing apparatus according to claim 1, further comprising a memory unit configured to store an amount of the liquid detected by the liquid amount detection unit, wherein in a case where the amount of the liquid detected by the liquid amount detection unit is greater than the amount of the liquid stored in memory unit, the control unit controls providing notification of the amount of the liquid detected by the liquid amount detection unit.

10. A method of controlling a printing apparatus including a storage unit configured to store a liquid to be supplied to a printhead, which performs printing by discharging the liquid, the method comprising:

detecting an amount of the liquid stored in the storage unit;

detecting, by a filling detection unit, a start of liquid filling into the storage unit based on a flow of the liquid; and controlling notification of the amount of the liquid detected by the liquid amount detection unit, in response to the filling detection unit detecting the start of liquid filling.

11. The printing apparatus according to claim 1, wherein the liquid amount detection unit includes a ground electrode and a plurality of electrode pins having different lengths, and a detection circuit configured to detect a change in resistance between the ground electrode and each of the electrode pins to determine the amount of the liquid stored in the storage unit.

12. The method according to claim 10, further comprising storing an amount of the liquid detected in a memory unit, wherein in a case where the amount of the detected liquid is greater than the amount of the liquid stored in the memory unit, the notification is provided of the amount of the detected liquid.

13. The method according to claim 10, wherein the amount of liquid is displayed on a display unit.

14. The method according to claim 10, wherein notification of the amount of liquid is provided via a speaker.

15. The method according to claim 10 further comprising detecting that liquid filling into the storage unit has started.

16. The method according to claim 10 further comprising detecting that a container for liquid filling has been mounted onto the storage unit.

17. The method according to claim 16, wherein in a case where mounting of the container is detected, notification of the amount of the liquid is provided.

18. The method according to claim 10 further comprising detecting that liquid is flowing into the storage unit.

19. A non-transitory computer readable storage medium storing a program for causing a computer to execute a method of controlling a printing apparatus including a storage unit configured to store a liquid to be supplied to a printhead, which performs printing by discharging the liquid, the method comprising:

detecting an amount of the liquid stored in the storage unit;

detecting, by a filling detection unit, a start of liquid filling into the storage unit based on a flow of the liquid; and controlling notification of the amount of the liquid detected by the liquid amount detection unit, in response to the filling detection unit detecting the start of liquid filling.

\* \* \* \* \*